US012759607B2

(12) United States Patent
Wee

(10) Patent No.: US 12,759,607 B2
(45) Date of Patent: Oct. 13, 2026

(54) APPARATUS, A SYSTEM, AND A METHOD FOR FACILITATING MOVEMENT OF AN OBJECT

(71) Applicant: Wee.no AS, Førresfjorden (NO)

(72) Inventor: Rune Wee, Førresfjorden (NO)

(73) Assignee: Wee.no AS, Førresfjorden (NO)

( * ) Notice: Subject to any disclaimer, the term of this patent is extended or adjusted under 35 U.S.C. 154(b) by 209 days.

(21) Appl. No.: 18/727,573

(22) PCT Filed: Jan. 20, 2023

(86) PCT No.: PCT/NO2023/050012
§ 371 (c)(1),
(2) Date: Jul. 9, 2024

(87) PCT Pub. No.: WO2023/158315
PCT Pub. Date: Aug. 24, 2023

(65) Prior Publication Data

US 2025/0083728 A1 Mar. 13, 2025

(30) Foreign Application Priority Data

Feb. 16, 2022 (NO) .................................... 20220213

(51) Int. Cl.
*B62B 5/00* (2006.01)

(52) U.S. Cl.
CPC .......... *B62B 5/0089* (2013.01); *B62B 5/0086* (2013.01); *B62B 2206/003* (2013.01); *B62B 2206/06* (2013.01)

(58) Field of Classification Search
CPC ... B62B 5/0089; B62B 5/0086; B62B 5/0083; B62B 2206/003; B62B 2206/06
See application file for complete search history.

(56) References Cited

U.S. PATENT DOCUMENTS 3,243,193 A 3/1966 Fulmer
3,529,736 A 9/1970 Lebre
(Continued)

FOREIGN PATENT DOCUMENTS

CN 103476688 A 12/2013
GB 1479393 A 7/1977
JP H08230976 A 9/1996

OTHER PUBLICATIONS

Examination Report for Australian Patent Application No. 2023221767, dated Jun. 12, 2025.
Hydraulic Lift Caster Assembly (R17000E), Sales drawing, Tandemloc Inc. 2014. Retrieved from the internet, https://www.tandemloc.com/content/documents/product-PDF/R17000F-7PA.pdf, last accessed Jul. 9, 2024.
(Continued)

*Primary Examiner* — John D Walters
(74) *Attorney, Agent, or Firm* — ANDRUS INTELLECTUAL PROPERTY LAW, LLP

(57) ABSTRACT

An apparatus, a system, and a method are for facilitating movement of an object. The apparatus has a bearing body provided with an engagement means; a wheel operatively connected to the bearing body via an arm that has a first end portion and a second end portion, wherein the first end portion of the arm is rotatably connected to the bearing body; and a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position. The engagement means of the bearing body is in the form of at least one protrusion arranged to be inserted into a forklift pocket arranged at a bottom portion of the object.

12 Claims, 13 Drawing Sheets

(56) References Cited

U.S. PATENT DOCUMENTS

| | | | | |
|---|---|---|---|---|
| 3,570,694 | A * | 3/1971 | Tantlinger | B65D 90/18 280/43.23 |
| 4,105,218 | A * | 8/1978 | Newell | B62B 5/0083 280/43.12 |
| 4,570,959 | A | 2/1986 | Grinwald | |
| 5,006,031 | A | 4/1991 | Fossing | |
| 6,939,098 | B2 * | 9/2005 | Schults | B66C 19/007 414/459 |
| 7,673,889 | B2 * | 3/2010 | Wells | B60P 1/6463 187/244 |
| 10,336,135 | B1 | 7/2019 | Engelbrecht | |
| 10,625,997 | B1 | 4/2020 | Fraley | |
| 2004/0013504 | A1 | 1/2004 | Schults | |
| 2007/0085288 | A1 | 4/2007 | Wells | |

OTHER PUBLICATIONS

International Search Report and the Written Opinion for Corresponding International Application No. PCT/NO2023/050012, dated Mar. 9, 2023.

Response to the Written Opinion for Corresponding International Application No. PCT/NO2023/050012, dated Apr. 24, 2023.

Second Written Opinion for Corresponding International Application No. PCT/NO2023/050012, dated Jul. 25, 2023.

Search Report for Corresponding Norwegian Application No. 20220213, dated Sep. 9, 2022.

International Preliminary Report on Patentability for Corresponding International Application No. PCT/NO2023/050012, dated Apr. 18, 2024.

Office Action issued in Chinese Patent Application No. 202380020612.4, dated Mar. 25, 2026.

* cited by examiner

APPARATUS, A SYSTEM, AND A METHOD FOR FACILITATING MOVEMENT OF AN OBJECT

CROSS-REFERENCE TO RELATED APPLICATIONS

This application is the U.S. national stage application of International Application No. PCT/NO2023/050012, filed Jan. 20, 2023, which international application was published on Aug. 24, 2023, as WO 2023/158315 in the English language. The International Application claims priority to Norwegian patent application No. 20220213, filed Feb. 16, 2022. The international application and Norwegian application are both incorporated herein by reference, in their entirety.

FIELD

The present invention concerns a transport apparatus, a system, and a method for the use of the same. More specifically, it concerns a lifting and transport apparatus for facilitating movement of an object. The object may typically be a receptacle arranged to transport goods, such as a closed or open cargo container. An open cargo container is also known as a "basket". The object will in the following also be referred to as a container.

BACKGROUND

When it is necessary to move a container, it is usually lifted by connecting a lifting device to lifting lugs on the top portion of the container, or it may be moved by means of a forklift truck or other types of specialised vehicles arranged to be engageable with the container.

A forklift truck requires free passage to be able to manoeuvre the forks on the forklift truck into the forklift pockets on the container. In addition, a container borne by a forklift truck must be transported in a direction that is predominantly parallel to the longitudinal axis of the forklift pockets, which requires free space along the entire longitudinal axis of the container. In this document, the longitudinal axis of the container means the longest extension the container has, and which is commonly perpendicular to the longitudinal axis of the forklift pockets. As such, a so-called 20-foot container will for example require a free width of over 6 metres when being transported by means of a forklift truck. At for example a freight depot or a dock area that accommodates storing and movement of containers, requirements for free width will usually not pose a problem, and forklift trucks will be available. The situation may be different in other areas, such as the workshop industry and at processing plants where space and/or availability of forklift trucks may be limited.

Solutions with wheel sets are known that in different ways may be coupled to a cargo container so that the cargo container may be towed by a vehicle. A disadvantage of such known solutions is that they are relatively time-consuming and complicated to dispose on the container, and that equipment is needed to lift the container up off a base while wheel sets are disposed on it.

From publication U.S. Pat. No. 10,336,135B1, a wheel adapter for lifting a cargo container and providing rolling mobility to the cargo container is known. The wheel adapter comprises: an adapter body; a container coupling, wherein a front end of the container coupling extends outwards and forwards from the adapter body, wherein the container coupling further comprises a container coupling bolt configured for coupling to an ISO coupling of a cargo container, and a rear end of the container coupling is rotatably coupled to the adapter body. A similar solution is described in publications U.S. Pat. Nos. 3,570,694A and 10,625,997B1, which both describe container coupling bolts arranged to be fixed to the corner posts of the container.

Publications U.S. Pat. Nos. 3,243,193A and 4,570,959A disclose a transport apparatus for lifting and transporting a load unit. The transport apparatus comprises a pair of wheels and fasteners for being fixed to complementarily adapted fixing devices on the bottom and wall portions of the load unit. The fixing means are arranged to be lifted and lowered relative to the pair of wheels.

Publication U.S. Pat. No. 5,006,031A discloses a transport and lifting device for receptacles. The transport and lifting device has bearing devices coupled to the upper part of a two-piece bearing frame for the receptacle. The parts of the bearing frame may be mutually displaced by means of interior hydraulic cylinders, which makes it possible to place two devices along the sides of a transport vehicle to reach above a receptacle resting on the platform of the vehicle and thereafter pull its lower parts up to the level of the platform, whereupon bearing devices that chain together with supports and sliding rods enable lifting and lowering the receptacle.

The solutions according to prior art described above must be fixed to the object that is to be moved.

There is therefore a need for an apparatus that in a simple manner may be coupled to an object, such as a standard-type container, and may lift the container relative to a base and bear the container so as to facilitate transport of the container without modifying the construction of the container in any way.

SUMMARY

The purpose of the invention is to remedy or reduce at least one of the disadvantages of prior art, or at least provide a useful alternative to prior art.

The purpose is fulfilled by the features specified in the description below and the subsequent patent claims.

According to the invention, an apparatus is provided that in a simple manner may be engaged with the object, for example a container to be moved, and wherein the apparatus is provided with wheels that may be activated from a passive first position to an active second position, wherein the apparatus is arranged to be able to lift at least a portion of the object relative to the base and bear the object at a distance from a base.

The invention is defined by the independent patent claims. The dependent claims define advantageous embodiments of the invention.

In a first aspect of the invention there is provided an apparatus for facilitating movement of an object, such as a cargo container, on a base, wherein the apparatus comprises:

- a bearing body provided with an engagement means with a longitudinal axis, wherein the engagement means is arranged to be engageable with a lower portion of the object;
- a wheel with a wheel axle that is operatively connected to the bearing body via an arm that has a first end portion and a second end portion, wherein the first end portion of the arm is rotatably connected to the bearing body; and
- a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position, so that when the engagement means of the apparatus in a position of use is engaged with the object and the wheel is in the passive first position, the object abuts the base, while when the wheel is in the active second position, the bearing body with the engagement means is lifted up so that the apparatus bears a portion of the object over the base. The wheel axle is in at least one position parallel to the longitudinal axis of the engagement means, and the engagement means of the bearing body is in the form of at least one protrusion arranged to be inserted into a forklift pocket arranged at a bottom portion of the object.

The bearing body may have a longitudinal axis, and the arm may have a longitudinal axis, so that the mutual angle ratio of the longitudinal axes is changed when the arm is rotated between the passive first position and the active second position. In the passive position, it is advantageous if a lowermost portion of the wheel that faces the base is disposed at an elevation relative to an underside of the bearing body that is adapted to the portion of the object that receives the engagement means of the apparatus. The lowermost portion of the wheel that faces the base will, when the wheel is in its passive position, typically, but not exclusively, be arranged with an elevation that is equal to or higher than the underside of the bearing body. The effect of this is that the engagement means of the apparatus may in a simple manner be engaged with a portion of the object that is arranged to receive the engagement means of the apparatus without having to raise the object over the base.

It may be advantageous if the bearing body is provided with at least two arms, wherein each of the at least two arms is coupled to a driving device and a wheel, the arms being disposed at a mutual distance along the bearing body. The term along the bearing body refers to along a longitudinal direction of the bearing body. In a position of use of the apparatus, the bearing body is typically arranged predominantly parallel to a side portion of the object. By providing the bearing body with at least two arms and associated wheels and driving device, the weight of the object may be distributed between said at least two wheels. Further, at least two wheels disposed at a mutual distance along the bearing body will be able to provide a stable bearing of the object.

As described above, the engagement means of the bearing body is in the form of at least one protrusion arranged to be releasably inserted into a forklift pocket arranged at a bottom portion of the object. The object may typically be a container. By releasably inserting the protrusion into a forklift pocket, modification of the object's construction is avoided. For some of the applications of the object, modification of the object is not allowed without subsequent recertification of the object to ensure the technical integrity of the object. In one embodiment, the engagement means of the bearing body comprises two protrusions that are arranged to be inserted into one each of a pair of forklift pockets. At least one of said two protrusions may be arranged for sideways displacement along the longitudinal axis of the bearing body so that the protrusions may be adapted to objects with a pair of forklift pockets that have a non-standardised mutual distance. Two engagement means arranged at a mutual distance may provide a more stable lift and bearing of the object. In one embodiment, the apparatus comprises engagement means arranged to engage with both a forklift pocket and a fixing hole arranged in a corner portion of a bearing structure of the object, the fixing hole configured to receive a fixing means for fixing the object, for example a container, to a base.

In one embodiment of the apparatus, the wheel may be coupled to the arm nearer the first end portion than the second end portion so that the arm is arranged to be rotatable relative to the bearing body between the passive first position and the active second position by an operator. As such, the arm that bears the wheel may act as a lever.

The power that must be supplied by the operator therefore depends on the length of the lever from the portion of the arm where the wheel is coupled to the arm. In one embodiment, the second end portion of the arm may be arranged to receive an elongation element, for example a rod, so that an effective length of the arm may be increased when necessary. It is advantageous if the arm is lockable at least in the active position so that the operator may remain at a distance from the apparatus when it, in a position of use, is in the active position.

In one embodiment, the wheel is coupled to the second end portion of the arm. In such an embodiment, the driving device may also be coupled to the second end portion of the arm, or between the first end portion of the arm and the second end portion of the arm. A driving device for rotating the arm from the passive first position to the active second position may in such an embodiment be chosen from the group: fluid-operated driving device, electrically operated driving device and manually operated driving device. A fluid-operated driving device may be hydraulic or pneumatic. An electrically operated driving device May typically be a motor arranged to rotate a threaded rod that is threadedly engaged with a housing. Correspondingly, a manually operated driving device may be in the form of a jacking device, for example in the form of a threaded rod that is threadedly engaged with a housing, wherein the threaded rod is provided with a crank arranged to be rotated by an operator, or for example a rack jack.

In a second aspect of the present invention, a system is provided that comprises at least two apparatuses according to the first aspect of the invention. The system may be arranged in such a way that, in a position of use, at least one apparatus is engaged with a first side of the object, and at least one apparatus in the system is engaged with a second side of the object, wherein the second side is opposite the first side. Such a system that is coupled to an object will in an active position, meaning a position wherein the apparatuses that constitute the system, have wheels that are in their active position, be able to bear the entire object at a distance from the base.

By bearing the entire object at a distance from the base, a friction between the object and the base will predominantly be eliminated, while at the same time wear on the base and the object is avoided. Depending on the weight of the object and any inclination of the base, the object may thus be moved by means of pushing force by personnel, possibly by means of a motor-driven device such as for example a vehicle.

It may be advantageous if the system further comprises a further bearing body arranged for engagement in two opposite engagement means, so that the engagement means of two opposite apparatuses along with the further bearing body form an engagement means that extends between the side portions of the object. One effect of such a further bearing body is that the risk of the apparatuses twisting relative to the borne object is at least reduced. Twisting of the apparatuses relative to the object may lead to a skewed load of the contacting surface of the wheels against the base. A further effect is that the axial reach of the engagement means may be relatively limited compared to a system that does not have such a further bearing body. An unladen weight of the individual apparatus that forms part of the system may thereby be reduced.

In one embodiment of the second aspect of the invention, the system further comprises at least one nose wheel with a housing that is coupled to a bearing rod, wherein the bearing rod in a position of use is operatively connected to a bottom portion and a top portion of the object, wherein the nose wheel is arranged to be regulated in a linear manner relative to the housing between a retracted first position and an extended second position. In one embodiment, the system comprises at least two nose wheels coupled to one housing each, wherein the bearing rods of the at least two housings are disposed at a mutual distance in a side portion of the object that is perpendicular to the longitudinal axis of the object, typically the container.

A system may also be conceivable that comprises only nose wheels with housings coupled to bearing rods, wherein a nose wheel, in a position of use, is coupled by or near each of the four corner portions of the container so as to thereby provide a bearing of the object that is as stable as possible when moving the object.

In a third aspect, the invention concerns a method for facilitating the movement of an object, such as a cargo container, on a base, wherein the method comprises:

A)—providing a system according to the second aspect of the invention;

B)—engaging the engagement means of the bearing body of each of the apparatuses with the forklift pocket of the object (B) while the wheels of the apparatus are in the passive first position; and C)—rotating, by means of the driving device, the arm and the wheel relative to the bearing body from the passive first position to the active second position, so that when the engagement means of the apparatus in a position of use is engaged with the object, and the arm and the wheel are rotated from the passive first position to the active second position, the bearing body with the engagement means is lifted from the base so that the apparatus bears a portion of the object over the base.

The method may further comprise, before step B), engaging a further bearing body with the engagement means of one of the opposite apparatuses, and then, in step B), engaging the further bearing body with the engagement means of the other of the opposite apparatuses, so that the opposite engagement means and the further bearing body form a continuous engagement means that extends between the side portions of the object.

When using a system according to the second aspect of the invention, wherein the system comprises two apparatuses that each comprise only one wheel, it may be advantageous to dispose at least one nose wheel with a housing that is coupled to a bearing rod on a side portion of the object, wherein the side portion may be perpendicular to the side portions that the engagement means of the apparatus is engaged with. Such a nose wheel may facilitate stable movement of the object.

BRIEF DESCRIPTION OF THE DRAWINGS

In the following, examples are described of preferred embodiments which are illustrated in the attached drawings, wherein.

DETAILED DESCRIPTION OF THE DRAWINGS

Figure 1A:
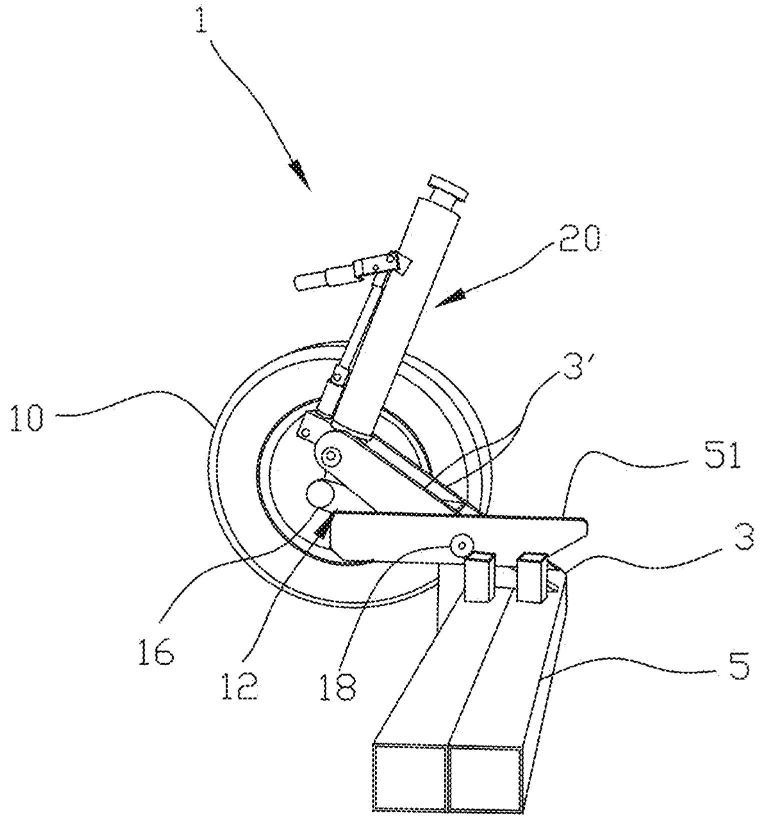
FIG. 1*a* shows a first embodiment of the apparatus according to the invention, seen from a first side, wherein the apparatus is in a passive first position.

All position indicators refer to the position shown in the figures.

The same or corresponding elements are indicated with the same reference number in the figures. For the sake of clarity some elements may not have reference numbers in some of the figures.

A person skilled in the art will understand that the figures are only principle drawings. The relative ratio between individual elements may also be distorted.

In the figures, the reference number 1 indicates an apparatus according to the invention. The apparatus 1 comprises a bearing body 3 provided with an engagement means 5 for engagement with a bottom portion of an object B, such as a cargo container B shown in FIGS. 3*c* and 4.

The apparatus 1 further comprises a wheel 10 operatively connected to the bearing body 3 via an arm 12 that has a first end portion 14 and a second end portion 16, wherein the first end portion 14 of the arm 12 is rotatably connected to the bearing body 3 via a swivel coupling 18.

A driving device 20 is operatively connected to the bearing body 3 and a portion of the arm 12 that is at a distance from the first end portion 14 of the arm 12. The driving device 20 is arranged to rotate the arm 12 and the wheel 10 relative to the bearing body 3 between a passive first position and an active second position, so that when the engagement means 5 of the apparatus 1 in a position of use is engaged with the cargo container B and the wheel 10 is in the passive first position, the cargo container B abuts the base, while when the wheel 10 is in the active second position, the bearing body 3 with the engagement means 5 is lifted so that the apparatus 1 bears a portion of the cargo container over a base U, such as a floor.

FIGS. 1*a*-1*d* show an embodiment of the apparatus 1, wherein the apparatus 1 comprises one wheel 10 with a wheel axle 10' coupled to a second end portion 16 of an arm 12. As seen best in FIG. 1*c*, the arm 12 is in the shown embodiment made up of two elongated, plate-shaped elements 12' arranged in parallel and at a mutual distance. The first end portion 14 of the arm 12 is rotatably coupled to a bearing body 3, which in the shown embodiment comprises two elongated, plate-shaped elements 3' fixed to an end portion of an engagement means 5, herein shown as two square tubulars that are sideways connected to each other by means of welding. The plate-shaped elements 3' that make up a part of the bearing body 3 protrude up at an angle from the end portion of the engagement means 5. The engagement means 5 is predominantly complementarily adapted to a forklift pocket at a bottom portion of a cargo container, so that the engagement means 5, in a position of use in the forklift pocket, is predominantly prevented from twisting about the longitudinal axis of the forklift pocket.

In the embodiment shown, the apparatus 1 is further provided with a contacting plate 51 for, in the position of use of the apparatus, abutting a portion of the object B.

A driving device 20 is in FIGS. 1*a*-1*d* shown as a manually operated hydraulic cylinder 20 that is operatively connected between an end portion of the plate-shaped elements 3' of the bearing body 3. As shown best in FIG. 1*c*, an end portion 21 of the piston rod 20' of the hydraulic cylinder 20 is rotatably coupled about the axle 10' of the wheel 10 so that the arm 12 may rotate upon deployment and retraction of the piston rod.

Figure 1B:
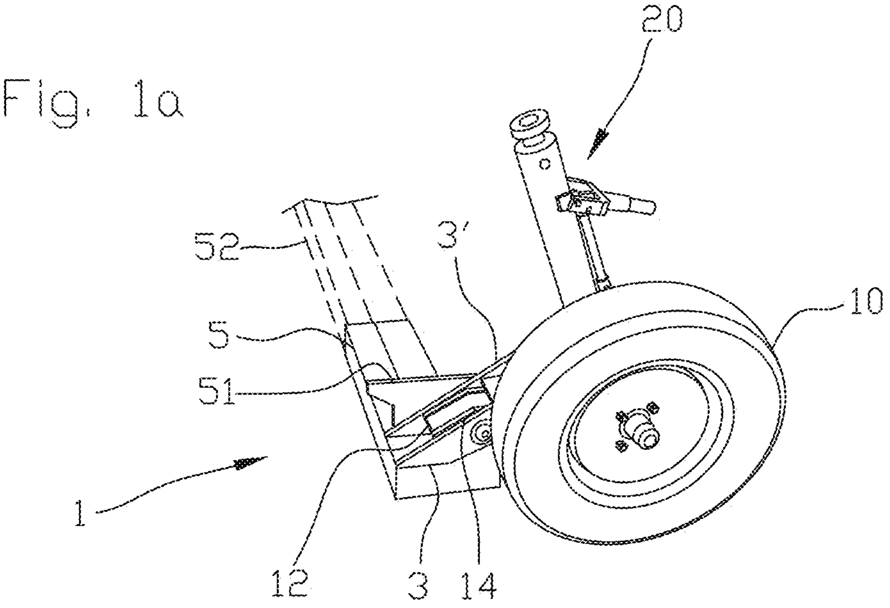
FIG. 1*b* shows the apparatus in FIG. 1*a* seen from a second side opposite the first side.
Figure 1C:
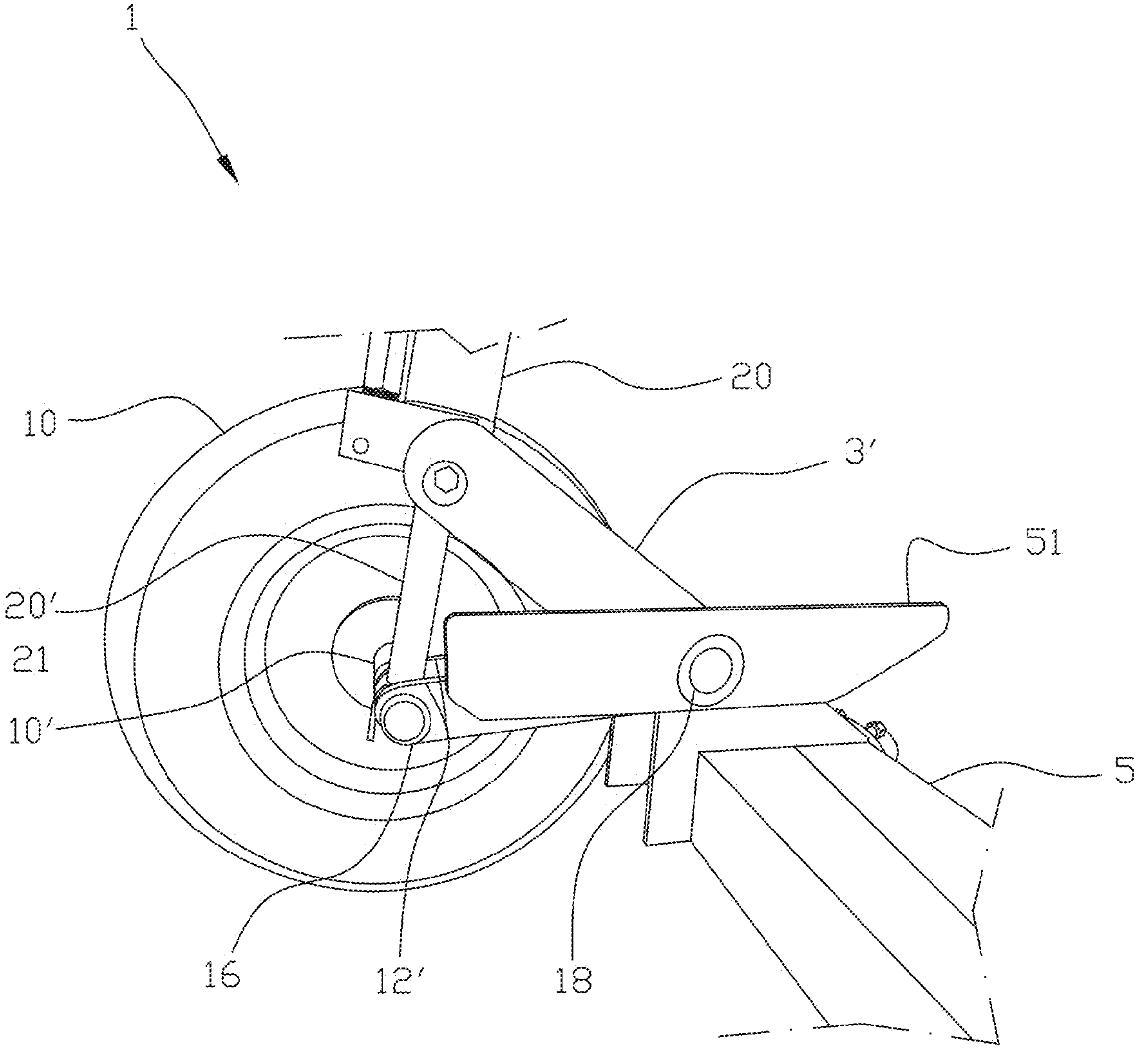
FIG. 1*c* shows at a larger scale the apparatus in FIG. 1*a*, but wherein the apparatus is in a second, active position.
Figure 1D:
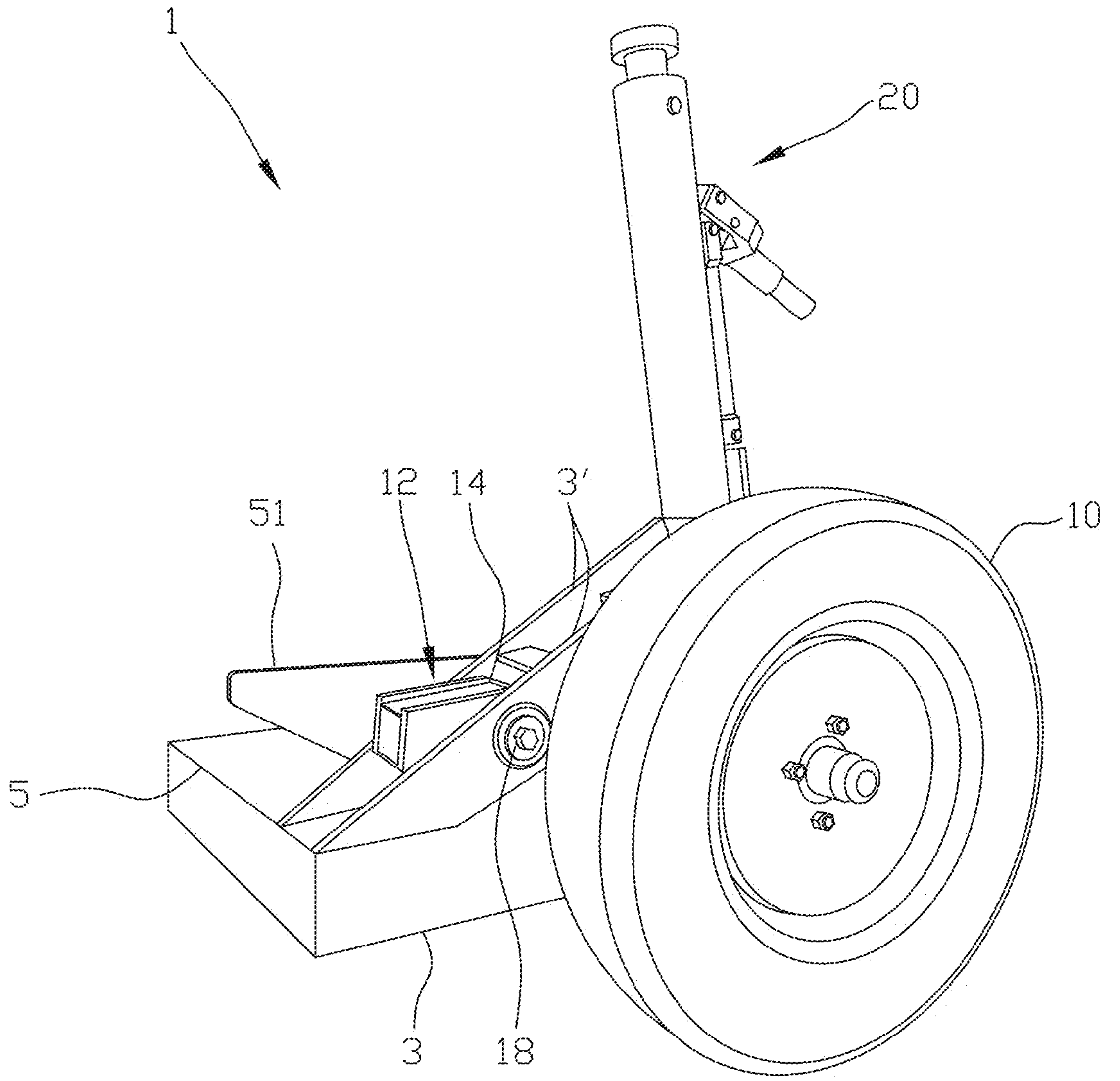
FIG. 1*d* shows the apparatus in FIG. 1*c* seen from the opposite side.

The embodiment shown in FIGS. 1*a*-1*c* is relatively easy to handle and may be used individually or in pairs, preferably on both sides of the cargo container to be moved on the base.

Figure 2:
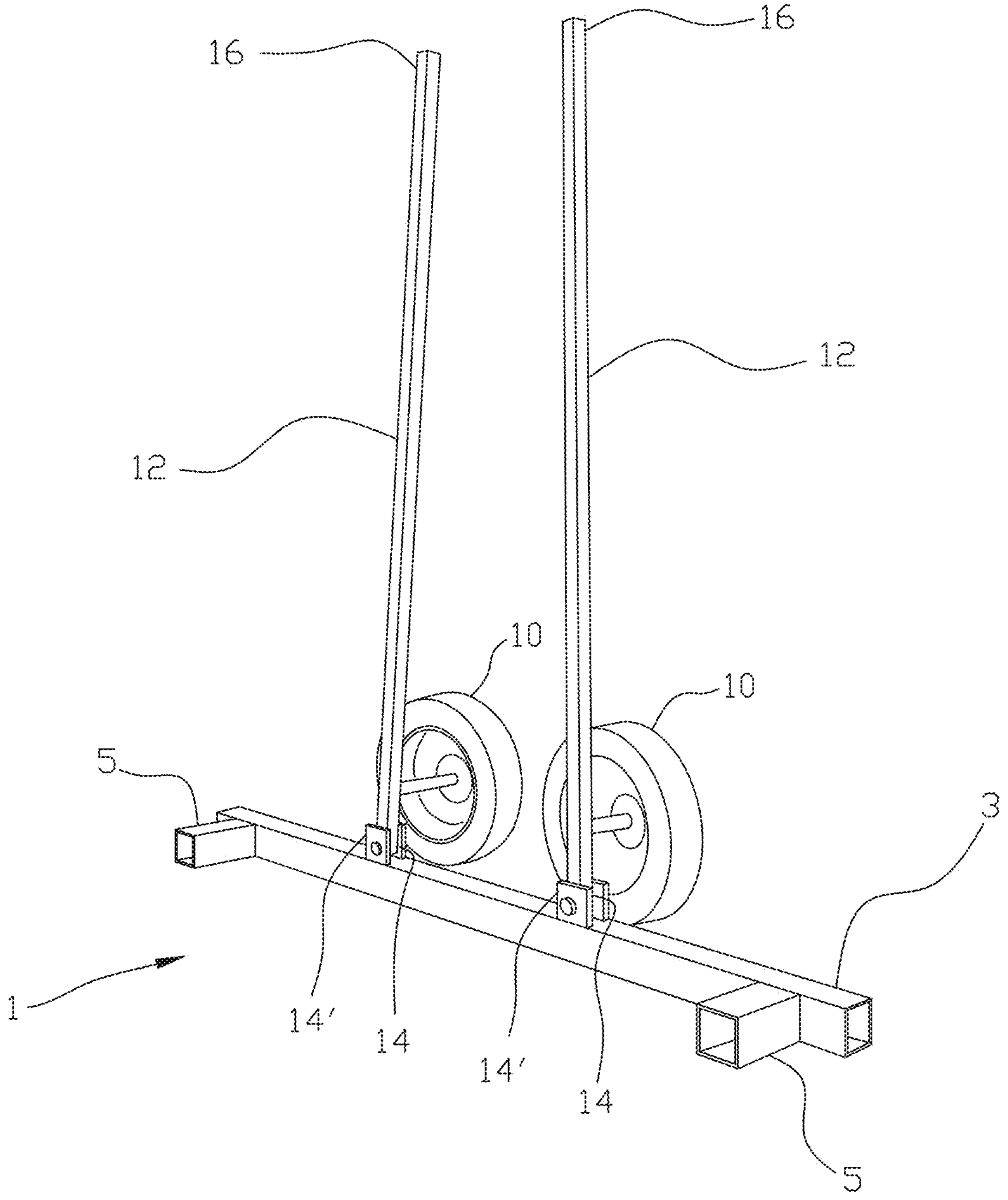
FIG. 2 shows a second embodiment of an apparatus according to the invention, wherein the apparatus comprises two arms that each bear a wheel, wherein the arms and the wheels are rotatably coupled to a bearing frame by engagement means.

FIG. 2 shows an alternative embodiment of the apparatus 1 according to the invention, wherein the bearing body 3 of the apparatus 1 is shown as an elongated hollow profile. The apparatus 1 is provided with two arms 12 that are arranged at a mutual distance along the longitudinal axis of the hollow profile 3. Each of the arms 12 is at its first end portion 14 freely rotatably coupled between two bearing plates 14' that bear a bolt that extends through an opening near the first end portion 14 of the arm 12. Each arm 12 is provided with a wheel 10 that is coupled to the arm 12 nearer the first end portion 14 of the arm 12 than the second end portion 16 of the arm 12. The hollow profile 3 is provided with two engagement means 5, herein shown as two hollow profiles with the same dimensions as the bearing body 3, wherein the engagement means 5 are arranged to be inserted into forklift pockets on for example a cargo container (not shown). The engagement means protrude outward in a perpendicular manner from a side portion of the bearing body 3 that is on the opposite side of the side portion of the bearing body on which the wheels 12 in a position of use, are located.

As shown in FIG. 2, the distance between the wheel 10 and the first end portion 14 of the arm 12 is considerably shorter than the distance between the wheel 10 and the second end portion 16 of the arm 12. This has the effect that the arm 12, in a position of use, provides a lever wherein the contact of the wheel 10 against a base makes up the tipping point of the lever. Depending on the weight of the object, for example the cargo container, an operator may apply a force to the arm 12 and rotate the arm 12 and the wheel 10 relative to the bearing body 3 between the passive first position and the active second position, so that when the engagement means 5 of the apparatus 1 in a position of use is engaged with the object and the wheel 10 is in the passive first position, the object abuts the base, while when the wheel 10 is in the active second position, the bearing body 3 with the engagement means 5 is lifted so that the apparatus 1 bears a portion of the object over the base.

In one embodiment (not shown), the distance between the wheel 10 and the second end portion 16 of the arm 12 may be shorter than the distance shown in FIG. 2, but wherein the second end portion 16 of the arm 12 is arranged to receive an elongation element, such as for example a rod, to thereby increase the moment of force of the lever (arm). An advantage of this latter embodiment is that the arms 12 will require less space when the apparatus 1 is not in use, or when the apparatus 1 is in its active position wherein the object is borne by the apparatus 1.

The apparatus 1 shown in FIG. 2 is further provided with locking means (not shown) to fix the arm 12 relative to the top surface of the bearing body 3 when the apparatus 1 is in its active position. In its simplest form, the locking means may be in the form of a sleeve that is pulled over the arms 12 and the end portions of the bearing body 3.

Figure 3A:
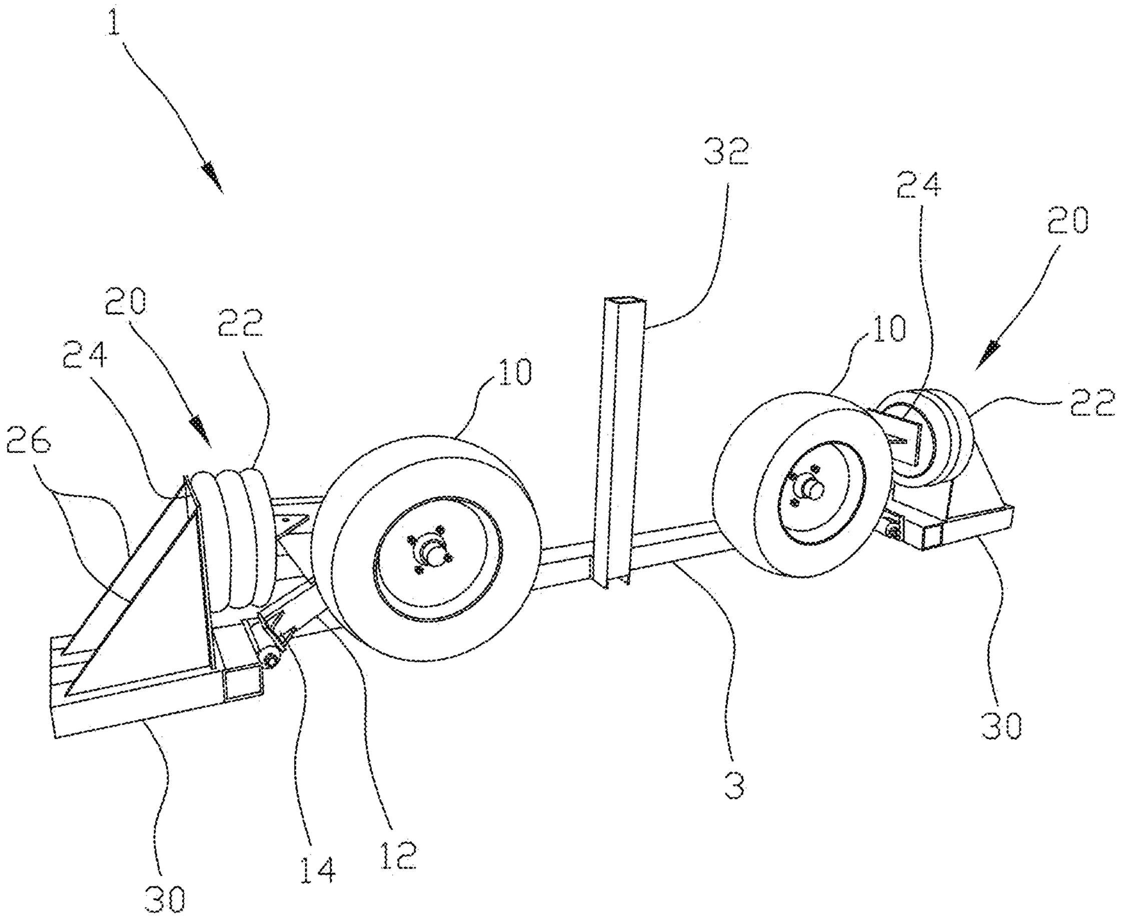
FIG. 3*a* shows a third embodiment of an apparatus according to the invention, seen from a first side, wherein the apparatus is in a passive first position.
Figure 3B:
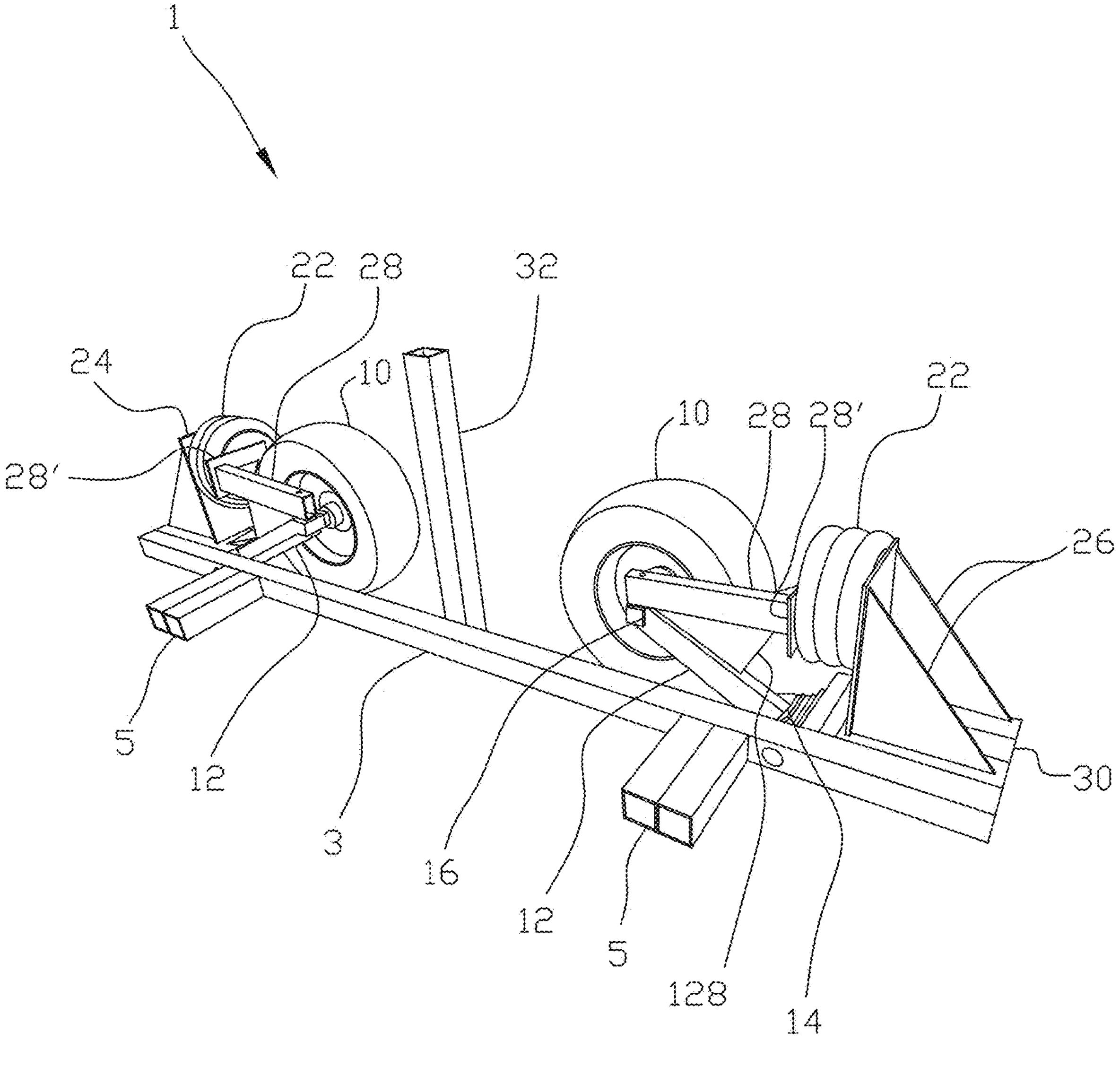
FIG. 3*b* shows the apparatus in FIG. 1 seen from a second side opposite the first side.
Figure 3C:
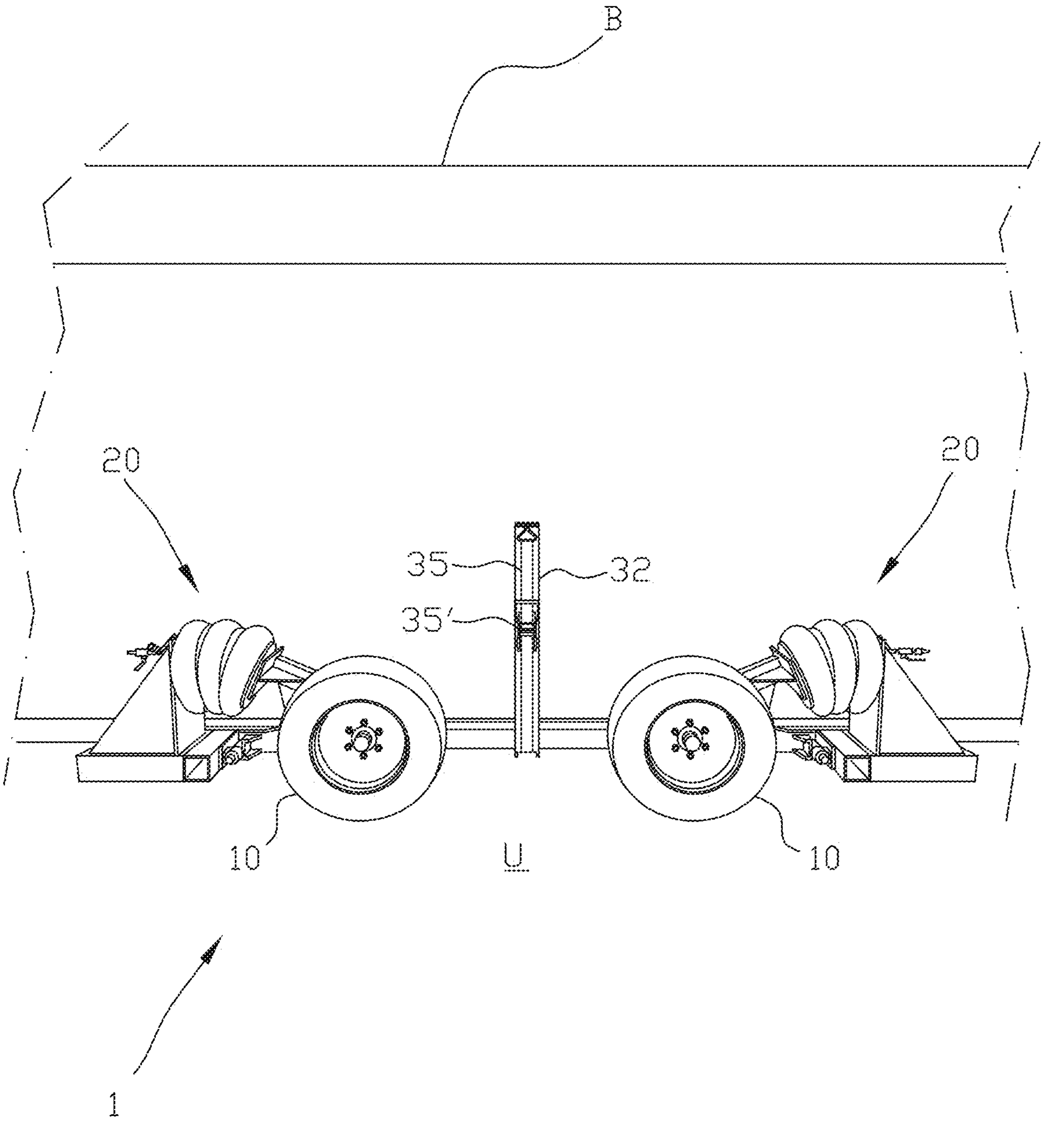
FIG. 3*c* shows the apparatus in FIG. 3*a* in a position of use, wherein the apparatus is coupled to a container and is in an active position.

FIGS. 3*a*-3*c* show a further alternative embodiment of the apparatus 1 according to the invention. The apparatus 1 in FIGS. 3*a*-3*c* shares certain similarities with the embodiment shown in FIG. 2, the apparatus 1 in FIGS. 3*a*-3*c* being provided with a bearing body 3 that is provided with two arms 12 that are coupled to a wheel 10 each. Each wheel 10 is arranged at a mutual distance along the bearing body 3 and two engagement means 5 that protrude outwards in a perpendicular manner from one of the two side portions of the bearing body 3. Further, the first end portion 14 of each of the two arms 12 is rotatably coupled to the bearing body 3.

In FIGS. 3*a*-3*c*, the wheels 10, as opposed to the embodiment shown in FIG. 2, are coupled at the second end portion 16 of the arm 12. The driving device 20 shown in FIGS. 3*a*-3*c* for rotating the arms 12 and the wheel 10 relative to the bearing body 3 between a passive first position (as shown in FIGS. 3*a* and 3*b*) and an active second position (as shown in FIG. 3*c*) is fluid-operated, herein shown as a pneumatic driving device 20 that comprises a bellow 22 arranged to receive a gas, typically air, from a pressurised gas source. Each bellow 22 is operatively connected to the bearing body 3 by means of a support, herein shown as a bearing plate 24 arranged to abut against a first end portion of the bellow 22, and two angled plates 26 that are fastened in a fixed manner to a foundation 30 arranged parallel to and fastened in a fixed manner to an end portion of the bearing body 3. The foundation 30 thus makes up a portion of the bearing body 3.

As best seen in FIG. 3*b*, the apparatus 1 is further provided with a driving arm 28 that has a first end portion with a support plate 28' that abuts a second end portion of the bellow 22, and a second end portion that is fixedly connected to the second end portion 16 of the arm 12. When the bellow 22 is activated, meaning when for example pressurised air is supplied to the bellow 22, the bellow 22 will apply a force on the driving arm 28, and the arm 12 and the wheel 10 will rotate from their passive position as shown in FIGS. 3*a* and 3*b* to their active position as shown in FIG. 3*c*.

In the embodiment shown, a bracing plate 128 is arranged between a portion of the arm 12 and the driving arm 28 to provide a rigid connection between them.

A support body 32 is fastened in a fixed manner to and protrudes up from a portion of the bearing body 3 between the wheels 10. The purpose of the support body 32 is to provide a side support against a portion of a side face of a container that is borne by the apparatus 1. When the bearing body 3 is arranged in parallel with the bottom portion of the container, the axles of the wheels 10 will be predominantly parallel to the base. In one embodiment, a top portion of the support body 32 is provided with an adjustment device (not shown) that protrudes in a perpendicular manner relative to a longitudinal axis of the support body so that an angle between the longitudinal axis of the support body 32 relative to the wall portion of the container may be adjusted.

In FIG. 3*c*, the bellows 22 are filled with a gas, typically air, and the apparatus 1 is driven to its active second position wherein the wheels 10 bear the rest of the apparatus 1 and a container over a base U.

The support body 32 is in FIG. 3*c* shown provided with a strap 35 with a tensioner 35'. The purpose of the strap 35 is to guide it under a bottom portion of the container after the container has been raised over the base by means of the apparatus 1, as shown, and secure an end portion of the strap to a portion of the support body 32 of an apparatus 1 in a system according to the second aspect of the invention, wherein said corresponding apparatus 1 is arranged on the opposite side of the container. By applying to the strap 35 a tensile force by means of the tensioner 35', the strap 35 will at least reduce sideways movement of the apparatus relative to the side portion of the container when the container is moved by means of the apparatus 1. Herein, sideways movement refers to the bearing body 3 and the engagement means 5 of the apparatus 1 being moved in a direction away from the side portion of the container.

As an alternative to a pneumatically operated driving device 20 in the form of the bellow 22 shown, the driving device 20 may be made up of a fluid-operated cylinder, for example a hydraulic cylinder (not shown), or the driving device 20 may be made up of an electrically operated driving device such as for example a motor arranged to rotate a threaded rod that is threadedly engaged with a housing. Correspondingly, a manually operated driving device may be in the form of a jacking device. As opposed to the bellow 22 shown in FIGS. 3*a*-3*d*, which is flexible as shown in FIG. 3*c*, said alternative driving devices must be rotatably connected to the bearing plate 24 and the arm 12 respectively to achieve the intended rotation of the arm 12 and thereby the wheels 10 between the first passive position and the second active position.

Figure 4:
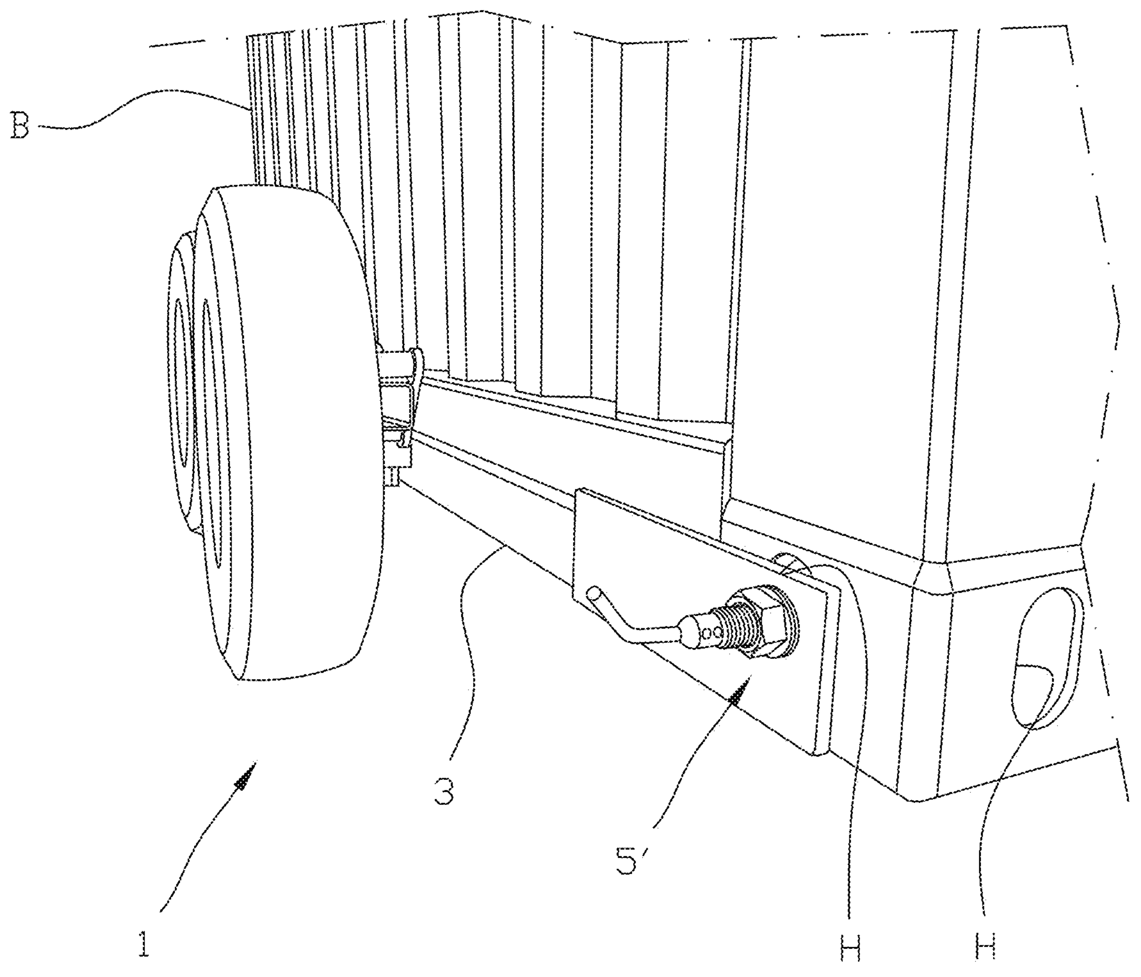
FIG. 4 shows a detail of a further engagement means.

In the embodiment examples described above and shown in FIGS. 1*a*-3*c*, the apparatus 1 is provided with engagement means 5 arranged to be engageable with for example forklift pockets arranged at a bottom portion of for example a cargo container. FIG. 4 shows an engagement means 5' which is, in addition to the engagement means 5, in the form of an engagement means that protrudes in a perpendicular manner from a side portion of the bearing body 3, as shown for example in FIGS. 1*a*-3*c*. The further engagement means 5' shown in FIG. 4 is arranged to be engaged in a lockable manner with a so-called fixing hole H, which is typically arranged at a bottom portion of the corner portions of the cargo container. Such fixing holes H in a container are used, among other things, to fix the container to a base, such as for example a deck on a floating vessel or a load bed of a transport means that runs on roads or tracks.

In the embodiment shown in FIG. 4, the bearing body 3 has a flat top surface, like the bearing body 3 shown in FIGS. 3*a*-3*c*. An apparatus 1 according to the invention wherein the bearing body 3 has a flat top surface, is suitable for, in a position of use, being disposed against a raised side portion that extends between the corner portions of the cargo container so that the load on the alternative engagement means 5' of the type shown for example in FIG. 4 is reduced. In cases where an apparatus only comprises the alternative engagement means 5', meaning without an engagement means 5 that protrudes in a perpendicular manner from a side portion of the bearing body 3 like in the apparatus 1 according to the invention, and where in addition it is not possible to guide the top surface of the bearing body 3 against a bottom portion of the cargo container without having to raise it from the base by means of a lifting apparatus, such as for example a forklift truck, the alternative engagement means shown in FIG. 4 is less relevant. However, the alternative engagement means 5', when used in combination with the engagement means 5 that protrudes in a perpendicular manner from a side portion of the bearing body 3, is useful with regards to temporarily locking the apparatus 1 to the container.

Figure 5A:
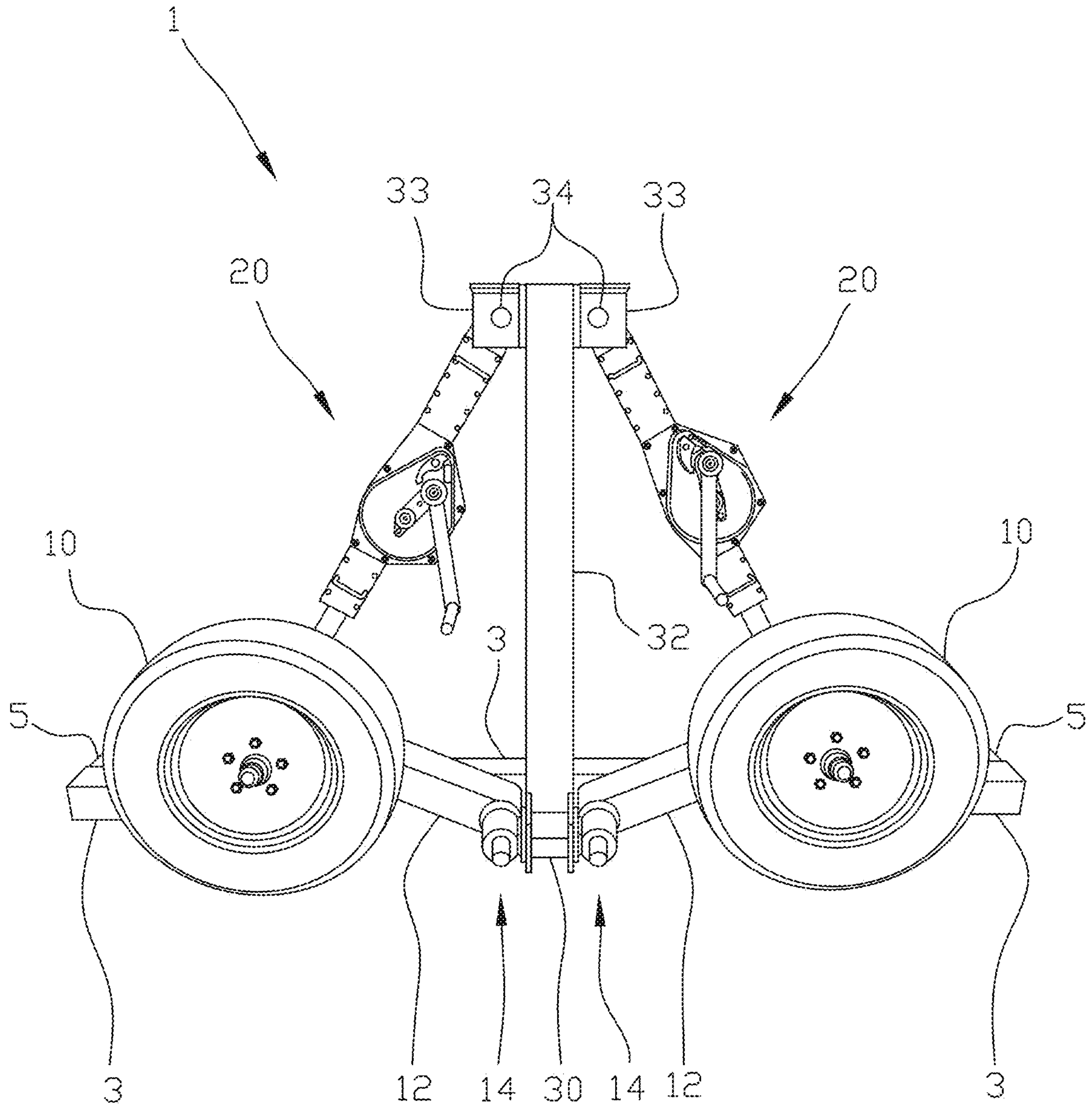
FIGS. 5*a*-5*b* show a third embodiment of the apparatus according to the invention, wherein the apparatus is in a passive first position.
Figure 5B:
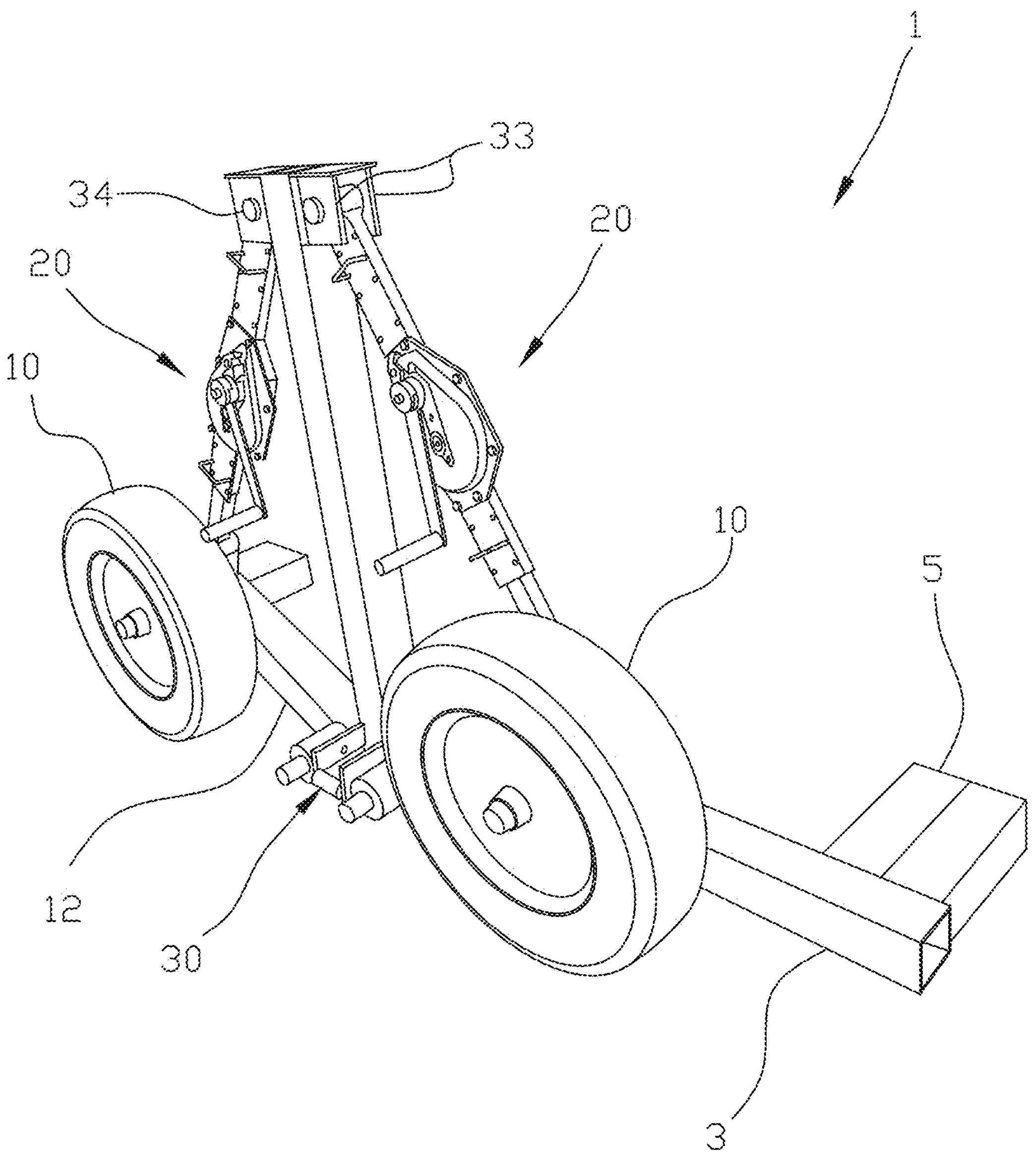

Reference is now made to FIGS. 5*a*-5*d*, which illustrate a further alternative embodiment of the apparatus according to the present invention. The embodiment shown in FIGS. 5*a*-5*d* shares similarities with the embodiment shown in FIGS. 3*a*-3*d*, the apparatus 1 in FIGS. 5*a*-5*d* being provided with a bearing body 3 that is provided with two arms 12 that are coupled to a wheel 10 each. Each wheel 10 is provided at a mutual distance along the bearing body 3. Further, the bearing body 3 is provided with two engagement means 5 that protrude in a perpendicular manner from one of the two side portions of the bearing body 3 in the longitudinal direction of the bearing body 3. The first end portions 14 of each of the two arms 12 are rotatably connected to the bearing body 3 via a foundation or a coupling body 30 and a bottom portion of a support body 32, which are both fixed to a portion of the bearing body 3. The support body 32 has the same purposes as described above in connection with FIGS. 3*a*-3*c*, and therefore these are not repeated here. However, a further purpose of the support body 32 is to provide a coupling point for a first end portion of each driving device 20, herein shown as two rack jacks 20, which are rotatably connected to an upper end portion of the support body 32 through paired plates 33 that bear bolts 34. The paired plates 33 are best seen in FIG. 5*b*. The driving devices 20 shown in FIGS. 5*a*-5*d* are thus indirectly operatively connected to the bearing body 3, the support body 32 being rigidly connected to the bearing body 3.

A further, significant difference between the embodiment shown in FIGS. 3*a*-3*c* and the embodiment shown in FIGS. 5*a*-5*d* is that the first end portion 14 of both arms 12 is rotatably coupled to the foundation or the support body 30, meaning that the first end portions 14 of the arms 12 are coupled to one common support body 30. Thereby the embodiment shown in FIGS. 5*a*-5*d* represents a relatively simple solution that may weigh less than the solution shown in said FIGS. 3*a*-3*c*. Further, a mutual distance between the wheels 10 may be changed by providing the apparatus 1 with arms 12 that have the desired axial reach. Since there are no structural obstacles to the position of the wheels 10 along the bearing body 3, a mutual distance between the axles of the wheels 10 may be greater than the axial reach of the bearing body 3. As such, a very stable bearing of for example a container may be achieved even with an apparatus 1 with a bearing body 3 that has an axial reach delimited to a distance between for example two forklift pockets on a container. Such an axial reach of the bearing body 3 is shown in FIGS. 5*a*-5*d*.

Each of the rack jacks 20, which are of a per se prior art, comprises a housing and a rack that is coaxially displaceable relative to the housing, in a manner that will be known to a person skilled in the art. As shown in FIG. 5*d*, the rack has an end portion 21 that is rotatably connected to the arm 12 at the second end portion 16 of the arm 12 near the axle of the wheel 10. The housing of the rack jack 20 has an end portion 22 (see FIG. 5*a*) opposite the end portion 21 of the rack.

Figure 5C:
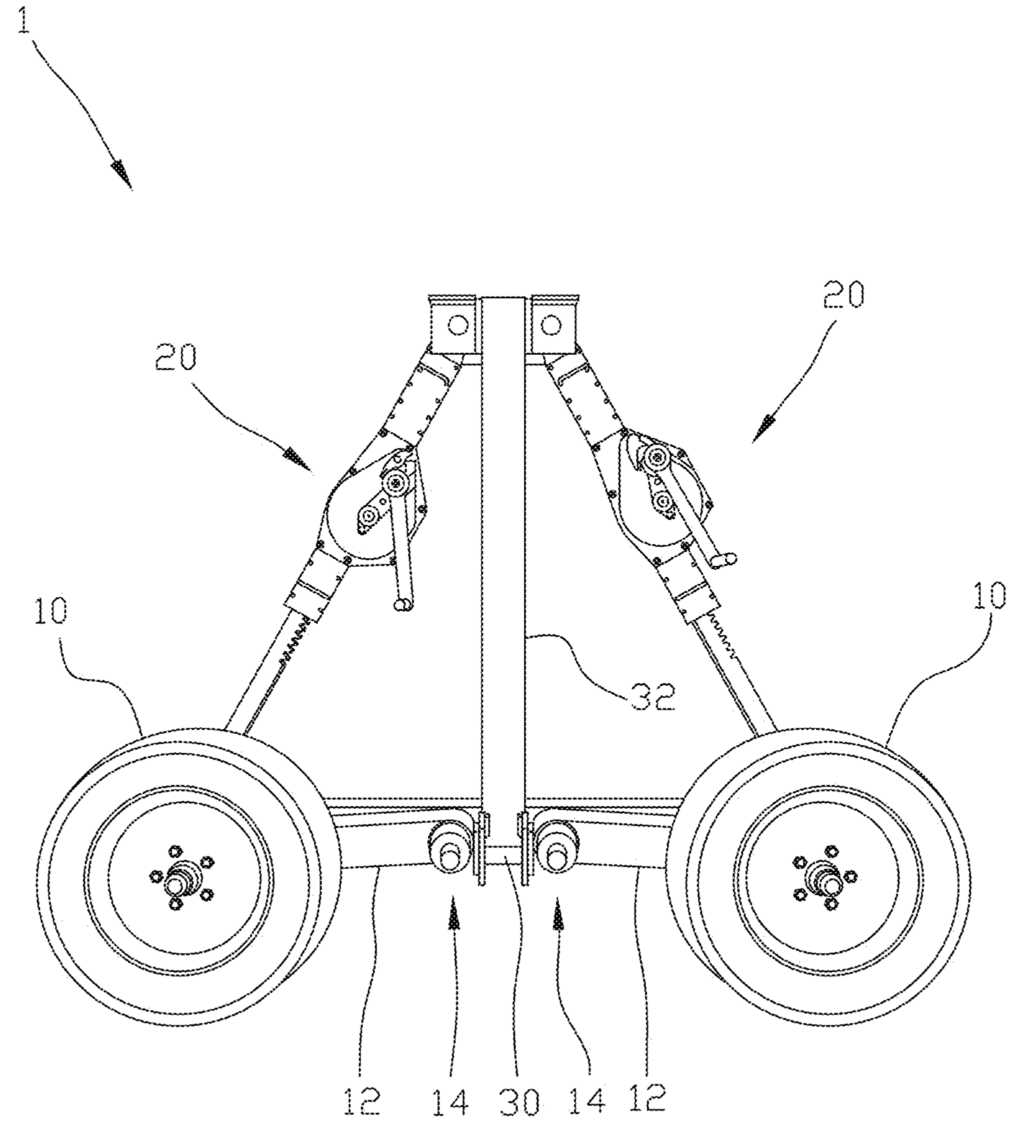
FIGS. 5*c*-5*d* show the apparatus in FIGS. 5*a* and 5*b*, but wherein the apparatus is in an active second position.
Figure 5D:
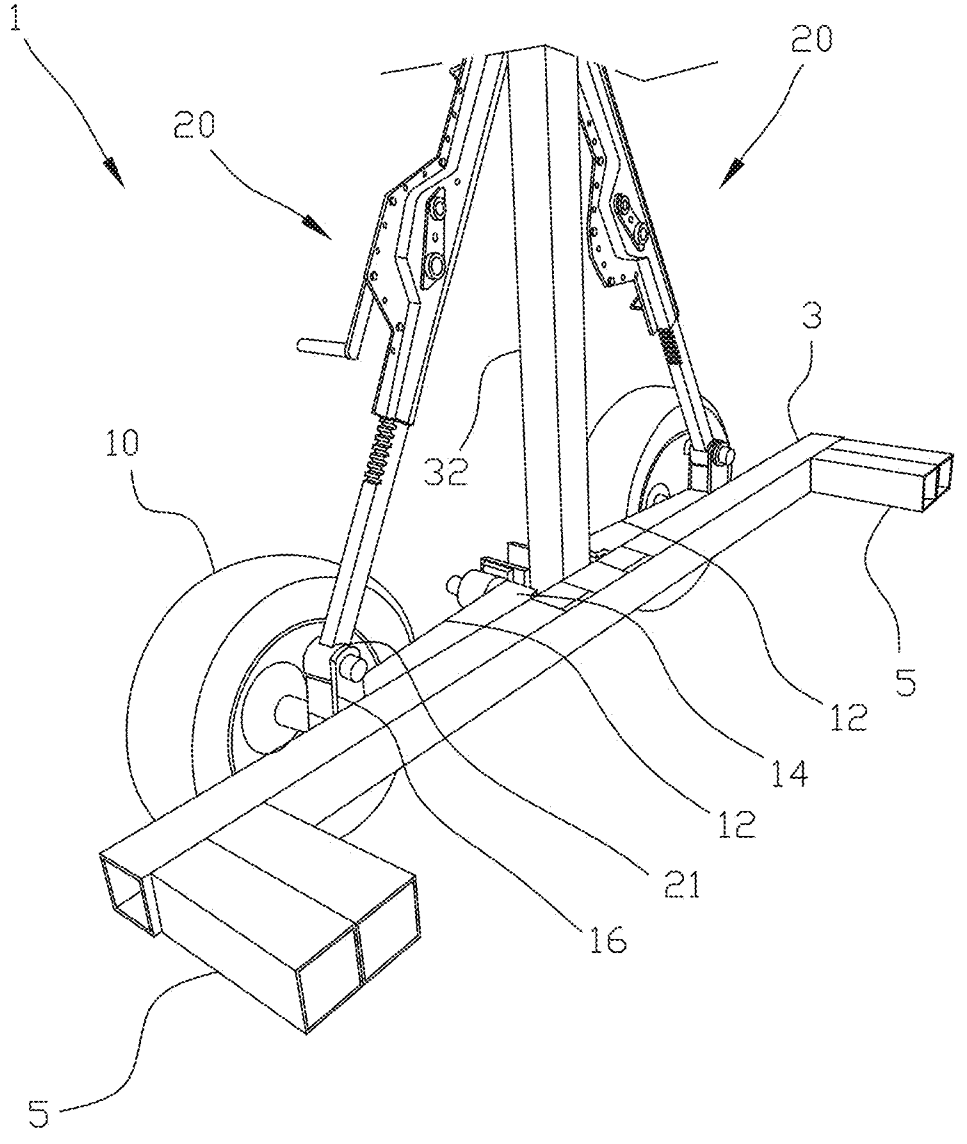

By operating the rack jack 20 so that the rack is pushed outwards relative to the housing, the arm 12 is rotated relative to the bearing body 3 from the passive first position of the apparatus 1, which is shown in FIGS. 5*a* and 5*b* wherein the wheels 10 are in a hoisted position relative to the bearing body 3, to the active second position of the apparatus 1 as shown in FIGS. 5*c* and 5*d*.

As an alternative to driving devices 20 in the form of the rack jacks shown, the driving devices may be made up of for example fluid-operated driving devices, or of an electrically operated driving device such as for example a motor arranged to rotate a threaded rod that is threadedly engaged with a housing.

In a system according to the invention, wherein the system comprises at least two apparatuses 1 of any of the embodiments described above, and wherein the system is arranged so that, in a position of use, at least one apparatus 1 is engaged with a first side of an object, such as for example a container, and at least one apparatus 1 is engaged with a second side of the object, it may be advantageous if a further bearing body 52 is engaged with for example two opposite engagement means 5 of the type shown in FIGS. 1*a*-3*c* and 5*a*-5*d*. An example of such a further bearing body is shown with dotted lines in FIG. 1*b*. In a position of use, such a further bearing body 52 will act as a load-distributing bearing axle that at least reduces the risk of the apparatuses 1 twisting relative to the objects being borne. The apparatuses 1 twisting relative to the object may lead to a skewed load of the contacting surface of the wheels 10 against the base.

FIGS. 3*a*-3*c* and 5*a*-5*d* show the apparatus 1 with a pair of wheels 10. For facilitating movement of the object along a curved path, at least one of the two wheels 10 of the apparatus 1 in one embodiment (not shown) is arranged in a swingable manner relative to the bearing body 3 of the apparatus 1. In such an embodiment, such a swingable wheel 10 is operatively connected to the arm 12 through a rotary joint that will be known to a person skilled in the art.

Figure 6A:
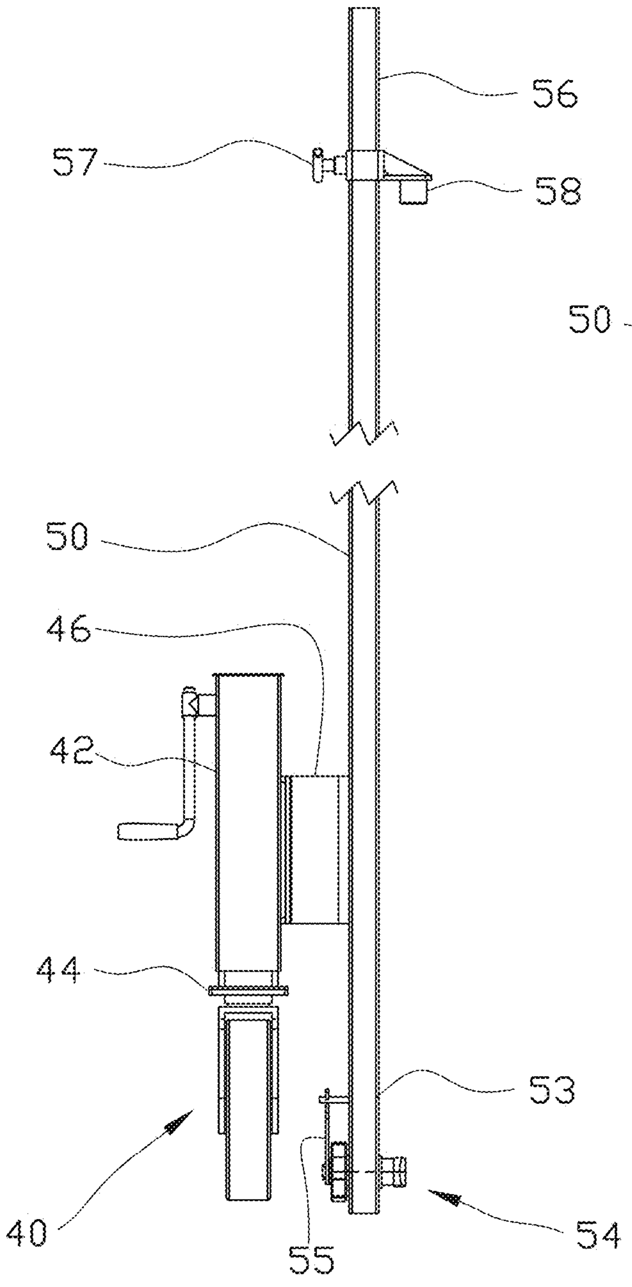
FIGS. 6*a*-6*b* show a nose wheel for use in a system according to the invention, wherein the nose wheel is linearly displaceable relative to a housing that is fixed to a bearing rod.
Figure 6B:
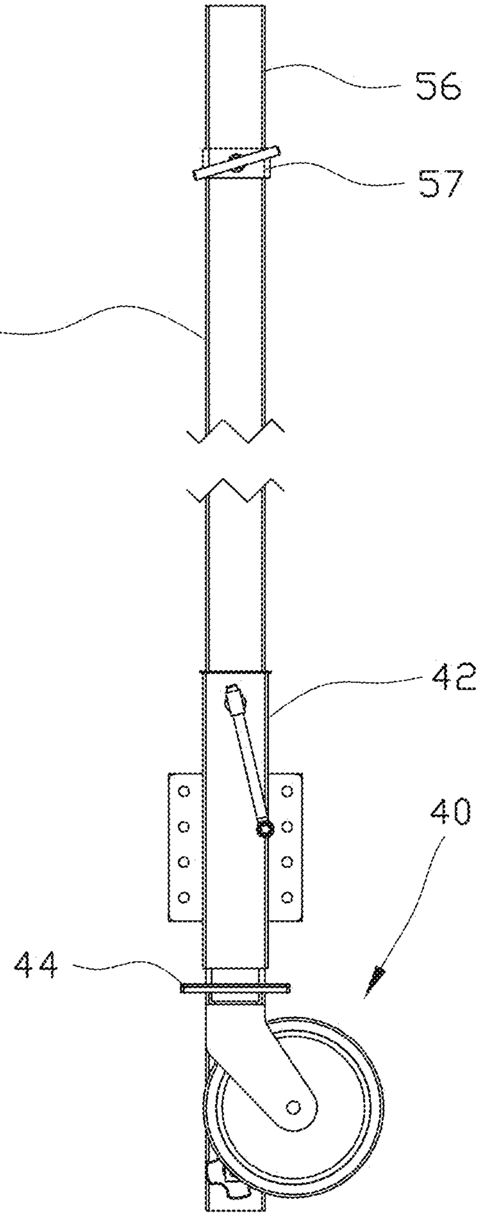

FIGS. 6*a* and 6*b* show a nose wheel 40 that is linearly displaceable relative to a housing 42 in a per se known manner. The nose wheel is provided with a rotation device 44 that allows 360° relative to the housing 42. The housing 42 is fixed to a bearing rod 50 via a connection element 46.

The bearing rod 50 has a first end portion 53 with connection means 54 configured for locking releasably to a hole H (see FIG. 4) in a lower corner portion of a container. The connection means 54 is operatively connected to a locking means 55, herein shown as a so-called twist-lock, to prevent unintentional release of the connection means 54 when it is engaged with the hole H in the lower part of the container.

The bearing rod 50 is at a second end portion 56 provided with an axially displaceable connection means 57 that comprises a locking tab 58 arranged to be lowered down and engaged with a complementary hole in an upper portion of a container.

The primary purpose of the nose wheel 40 is to act as a support for a container that is borne by apparatuses 1 according to the invention, especially when used in a system according to the invention with only one wheel 10 on each side of the container.

It should be noted that all embodiments mentioned above illustrate the invention, but do not delimit it, and persons skilled in the art will be able to design many alternative embodiments without deviating from the scope of the attached claims. In the claims, the reference numbers in parenthesis shall not be considered delimiting.

The use of the verb "to comprise" and its different forms does not exclude the presence of elements or steps not mentioned in the claims. The indefinite articles "a" or "an" before an element do not exclude the presence of more such elements.

The invention claimed is:

1. An apparatus for facilitating movement of an object on a base, the apparatus comprising:

a bearing body provided with an engagement means with a longitudinal axis, wherein the engagement means is arranged to be engageable with a lower portion of the object;

a wheel with a wheel axle that is operatively connected to the bearing body via an arm that has a first end portion and a second end portion, wherein the first end portion of the arm is rotatably connected to the bearing body; and a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position, so that when the engagement means of the apparatus in a position of use is engaged with the object and the wheel is in the passive first position, the object abuts the base, while when the wheel is in the active second position, the bearing body with the engagement means is lifted up so that the apparatus bears a portion of the object over the base, wherein the wheel axle is in at least one position parallel to the longitudinal axis of the engagement means, and the engagement means of the bearing body is in the form of at least one protrusion arranged to be inserted into a forklift pocket arranged at a bottom portion of the object, and wherein the bearing body is provided with at least two arms, and wherein each of the at least two arms is coupled to a driving device and a wheel, the arms being disposed at a mutual distance along the bearing body.

2. The apparatus according to claim 1, wherein the wheel is coupled to the arm nearer the first end portion than the second end portion so that the arm is arranged to be rotatable relative to the bearing body between the passive first position and the active second position by an operator.

3. The apparatus according to claim 1, wherein the wheel is coupled to the second end portion of the arm.

4. The apparatus according to claim 1, wherein the driving device is selected from the group consisting of: a fluid-operated driving device, an electrically operated driving device, and a manually operated driving device.

5. A system comprising at least two apparatuses according to claim 1, wherein the system is arranged in such a manner that, in a position of use, at least one apparatus is engaged with a first side of the object, and at least one apparatus is engaged with a second side of the object, wherein the second side is opposite the first side.

6. The system according to claim 5, further comprising a further bearing body arranged for engagement in two opposite engagement means, so that the engagement means of two opposite apparatuses along with the further bearing body form an engagement means that extends continuously between the side portions of the object.

7. The system according to claim 5, further comprising at least one nose wheel with a housing that is coupled to a bearing rod, wherein the bearing rod in a position of use is operatively connected to a bottom portion and a top portion of the object, wherein the nose wheel is arranged to be regulated in a linear manner relative to the housing between a retracted first position and an extended second position.

8. A method for facilitating movement of an object, such as a cargo container, the method comprising:

A) providing a system according to claim 5;

B) engaging the engagement means of the bearing body of each of the apparatuses with the forklift pocket of the object while the wheels of the apparatus are in the passive first position; and C) rotating, by means of the driving device, the arm and the wheel relative to the bearing body from the passive first position to the active second position, so that when the engagement means of the apparatus in a position of use is engaged with the object, and the arm and the wheel are rotated from the passive first position to the active second position, the bearing body with the engagement means is lifted from the base so that the apparatuses of the system bear a portion of the object over the base.

9. The method according to claim 8, further comprising, before step B), engaging a further bearing body with the engagement means of one of the opposite apparatuses, and then, in step B), engaging the further bearing body with the engagement means of the other of the opposite apparatuses, so that the opposite engagement means and the further bearing body form a continuous engagement means that extends between the sides of the object.

10. A system comprising at least two apparatuses for facilitating movement of an object on a base, each of the apparatuses comprising:

a bearing body provided with an engagement means with a longitudinal axis, wherein the engagement means is arranged to be engageable with a lower portion of the object;

a wheel with a wheel axle that is operatively connected to the bearing body via an arm that has a first end portion and a second end portion, wherein the first end portion of the arm is rotatably connected to the bearing body; and a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position, so that when the engagement means of the apparatus in a position of use is engaged with the object and the wheel is in the passive first position, the object abuts the base, while when the wheel is in the active second position, the bearing body with the engagement means is lifted up so that the apparatus bears a portion of the object over the base, wherein the wheel axle is in at least one position parallel to the longitudinal axis of the engagement means, and the engagement means of the bearing body is in the form of at least one protrusion arranged to be inserted into a forklift pocket arranged at a bottom portion of the object, and wherein the system is arranged in such a manner that, in a position of use, at least one apparatus is engaged with a first side of the object, and at least one apparatus is engaged with a second side of the object, wherein the second side is opposite the first side, and further comprising a further bearing body arranged for engagement in two opposite engagement means, so that the engagement means of two opposite apparatuses along with the further bearing body form an engagement means that extends continuously between the side portions of the object.

11. A system comprising at least two apparatuses for facilitating movement of an object on a base, each of the apparatuses comprising:

a bearing body provided with an engagement means with a longitudinal axis, wherein the engagement means is arranged to be engageable with a lower portion of the object;

a wheel with a wheel axle that is operatively connected to the bearing body via an arm that has a first end portion and a second end portion, wherein the first end portion of the arm is rotatably connected to the bearing body; and a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position, so that when the engagement means of the apparatus in a position of use is engaged with the object and the wheel is in the passive first position, the object abuts the base, while when the wheel is in the active second position, the bearing body with the engagement means is lifted up so that the apparatus bears a portion of the object over the base, wherein the wheel axle is in at least one position parallel to the longitudinal axis of the engagement means, and the engagement means of the bearing body is in the form of at least one protrusion arranged to be inserted into a forklift pocket arranged at a bottom portion of the object, and wherein the system is arranged in such a manner that, in a position of use, at least one apparatus is engaged with a first side of the object, and at least one apparatus is engaged with a second side of the object, wherein the second side is opposite the first side, and further comprising at least one nose wheel with a housing that is coupled to a bearing rod, wherein the bearing rod in a position of use is operatively connected to a bottom portion and a top portion of the object, wherein the nose wheel is arranged to be regulated in a linear manner relative to the housing between a retracted first position and an extended second position.

12. A method for facilitating movement of an object, such as a cargo container, the method comprising:

A) providing a system comprising at least two apparatuses for facilitating movement of an object on a base, each of the apparatuses comprising:

a bearing body provided with an engagement means with a longitudinal axis, wherein the engagement means is arranged to be engageable with a lower portion of the object;

a wheel with a wheel axle that is operatively connected to the bearing body via an arm that has a first end portion and a second end portion, wherein the first end portion of the arm is rotatably connected to the bearing body; and a driving device that is directly or indirectly operatively connected to the bearing body and a portion of the arm that is at a distance from the first end portion of the arm, wherein the driving device is configured to rotate the arm and the wheel relative to the bearing body between a passive first position and an active second position, so that when the engagement means of the apparatus in a position of use is engaged with the object and the wheel is in the passive first position, the object abuts the base, while when the wheel is in the active second position, the bearing body with the engagement means is lifted up so that the apparatus bears a portion of the object over the base, wherein the wheel axle is in at least one position parallel to the longitudinal axis of the engagement means, and the engagement means of the bearing body is in the form of at least one protrusion arranged to be inserted into a forklift pocket arranged at a bottom portion of the object, and wherein the system is arranged in such a manner that, in a position of use, at least one apparatus is engaged with a first side of the object, and at least one apparatus is engaged with a second side of the object, wherein the second side is opposite the first side;

B) engaging the engagement means of the bearing body of each of the apparatuses with the forklift pocket of the object while the wheels of the apparatus are in the passive first position; and C) rotating, by means of the driving device, the arm and the wheel relative to the bearing body from the passive first position to the active second position, so that when the engagement means of the apparatus in a position of use is engaged with the object, and the arm and the wheel are rotated from the passive first position to the active second position, the bearing body with the engagement means is lifted from the base so that the apparatuses of the system bear a portion of the object over the base; and further comprising, before step B), engaging a further bearing body with the engagement means of one of the opposite apparatuses, and then, in step B), engaging the further bearing body with the engagement means of the other of the opposite apparatuses, so that the opposite engagement means and the further bearing body form a continuous engagement means that extends between the sides of the object.

* * * * *